June 18, 1929.  W. R. HUME  1,717,779
METHOD OF WELDING
Filed Dec. 29, 1928

Inventor:
Walter Reginald Hume
By
Attorney.

Patented June 18, 1929.

1,717,779

UNITED STATES PATENT OFFICE.

WALTER REGINALD HUME, OF MELBOURNE, VICTORIA, AUSTRALIA.

METHOD OF WELDING.

Application filed December 29, 1928, Serial No. 329,185, and in Australia December 16, 1927.

This invention relates to fences, railings, grilles, gates, frames and such like structures built up of metal rails, rods, bars or the like, and is particularly applicable to structures of the kind wherein two or more metal rails or members are spanned by cross bars or rods which are secured at their ends to the rails.

According to a method commonly followed in the production of such structures, cross bars or rods of suitable length are electrically welded at their ends to the rail members, the form of welded joint being usually of the butt type. An objection at present experienced when following this method is that the butt welding operations tend to cause longitudinal expansion of the cross bars which results in waving or distortion of the rail or like members and consequent marring of the finished structure.

One of the objects of the present invention is to overcome such objections by adopting an end construction for the metal cross bars or rods which enables them to be readily and effectively spot welded to the associated rail members. By spot welding the cross bars and rail members it is possible to avoid distortion of such parts and, at the same time, spot welding operations may be carried out very quickly and efficiently at an extremely low cost.

A further object of the invention is to provide improved structures of the kind indicated in which the end of the metal cross bars are spot welded to the rail or like members, in a manner more fully set out hereinafter, whereby the finished article is devoid of distortion and is of enhanced appearance.

Referring to the drawings which form part of this specification:—

Figure 1:
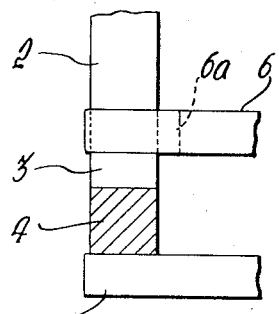
Figure 1 is a side fragmentary side view of a metal rod according to the invention being spot welded to a rail or like member.
Figure 2:
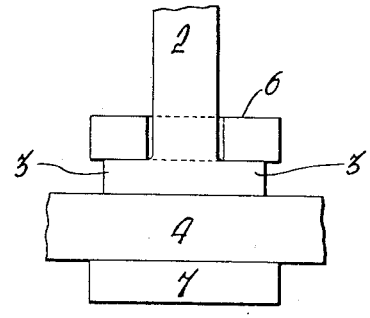
Figure 2 is a front view of Figure 1.
Figure 3:
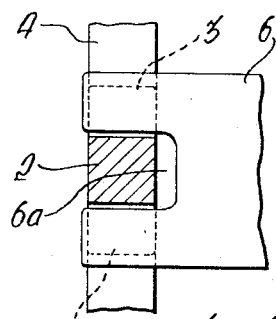
Figure 3 is a plan of Figure 1.

According to this invention, metal rods, bars or intervening members 2 which are to be secured to and extend between rail or spaced metal members 4 of a fence, gate or like grilled structure are provided at each end with feet or projections 3 which outstand at opposite sides thereof at an angle thereto. Each bar 2 is placed between the respective rail or like members 4 with the feet or projections 3 lying against the inner face of the respective rail member and preferably extending longitudinally thereof. The bar or rod is then spot welded to its rail members.

One of the carbon or other suitable welding electrodes 6, 7, employed may be bifurcated, as at $6^a$, to enable it to freely accommodate the adjacent portion of the bar 2 when the electrode is placed against the inner faces of the bar feet 3. The other welding electrode 7 may be of any suitable form and is adapted to contact with the outer face of the respective rail or like member 4 in alignment with the bifurcated electrode and the bar feet 3.

The feet 3 outstanding from the bars 2 offer great resistance to the passage of electric current between the electrodes and are thus heated to a very high temperature; so that by applying pressure to the electrodes the feet 3 become welded to the rail members. The bar proper is not heated to a great extent and any expansion or change in shape which may be caused by the welding operation is confined to the feet 3 at the end of the bar. Moreover, such expansion is so uniform for each joint and so slight as to be practically unnoticeable.

The zone of welding or fusion of each joint may, however, extend completely between the extreme end face of the bar and its feet and the adjacent face of the rail or like member and thus assure a particularly strong joint.

Figure 4:
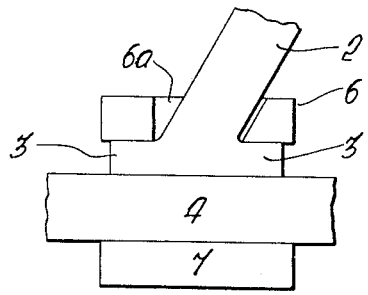
Figure 4 illustrates a rod extending at an inclination to a rail or the like member and being spot welded thereto.

It will be evident that, in instances where the bars 2 extend at angles other than right angles in relation to their rail or like members 3, the feet 4 at the ends of the bars may be offset or inclined in relation to the length of the bar, as in Figure 4, in order that they may lie flat against the respective face of the rail or like member.

Figure 5:
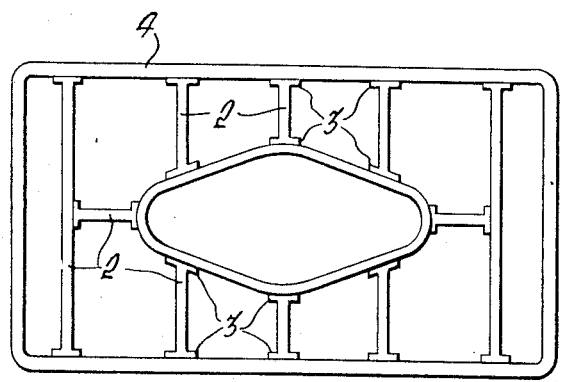
Figure 5 shows by way of example a structure built up of rods and the like, spot welded at their ends to each other and to a surrounding frame, in accordance with the invention.

A number of the bars 2 each provided with outstanding feet 3 may be readily spot welded at their ends to each other and to the rail or like members 4 forming a surrounding frame in the manner previously described to form or build any required design of structure, one example of which is illustrated in Figure 5. In this figure the central ornamental elliptical member is equivalent to a spaced metal member since the intervening members are welded thereto and to the outer spaced members.

Having now described my invention what I claim as new and desire to secure by Lettels Patent is:—

A method of integrally uniting two spaced metal members by an intervening metal member which consists in providing each end of the intervening member with oppositely disposed feet at an angle to the said intervening member, placing the intervening member between the said two spaced metal members with the oppositely-disposed feet in contact with the last-named members, and electrically welding the feet to the said two spaced metal members whereby the two spaced metal members will not be distorted by the heat of welding.

In testimony whereof I affix my signature.

W. R. HUME.